(12) United States Patent
Vaughan et al.

(10) Patent No.: US 6,259,440 B1
(45) Date of Patent: Jul. 10, 2001

(54) DEVICE WITH CONVERGED FUNCTIONALITY

(75) Inventors: Mark P. Vaughan, Spring; Thomas J. Brase; Drew S. Johnson, both of Houston; Kevin J. Brusky, Magnolia; Brian V. Belmont, Dallas, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/303,827

(22) Filed: May 3, 1999

Related U.S. Application Data

(63) Continuation of application No. 08/828,992, filed on Mar. 31, 1997, now abandoned.

(51) Int. Cl.[7] .................................................. G06F 3/14
(52) U.S. Cl. .................................... 345/327; 345/335
(58) Field of Search .................................. 345/326–358, 345/115

(56) References Cited

U.S. PATENT DOCUMENTS

| | | | |
|---|---|---|---|
| 4,956,707 | * | 9/1990 | Oakley et al. .................... 358/140 |
| 5,119,082 | * | 6/1992 | Lumelsky et al. ................ 345/327 X |
| 5,237,653 | * | 8/1993 | Noguchi et al. ...................... 345/348 |
| 5,283,561 | * | 2/1994 | Lumelsky et al. ................ 345/327 X |
| 5,367,316 | * | 11/1994 | Ikezaki .............................. 345/327 X |
| 5,436,676 | * | 7/1995 | Pint et al. ............................. 348/734 |
| 5,517,257 | * | 5/1996 | Dunn et al. ....................... 345/327 X |
| 5,524,195 | * | 6/1996 | Clanton, III et al. ............ 345/327 X |
| 5,557,724 | * | 9/1996 | Sampat et al. ........................ 345/327 |
| 5,594,467 | * | 1/1997 | Marlton et al. .................. 345/340 X |
| 5,606,374 | * | 2/1997 | Bertram ............................ 345/327 X |
| 5,731,844 | * | 3/1998 | Rauch et al. .......................... 348/563 |
| 5,889,506 | * | 3/1999 | Lopresti et al. .................. 345/327 X |

FOREIGN PATENT DOCUMENTS 1-267725 * 10/1989 (JP) .................................. G06F/3/14

* cited by examiner

*Primary Examiner*—Steven Sax
(74) *Attorney, Agent, or Firm*—Sharp, Comfort & Merrett, P.C.

(57) ABSTRACT

A electronic convergence device system comprising a computer for generating indications of a first mode of operation and for generating indications of a second mode of operation, and an output device coupled to the computer to receive the indications of the first and second modes of operation, which output device is provided for at least alternately outputting the indications of the first and second modes of operation, based on a user/viewer selection.

9 Claims, 4 Drawing Sheets

DEVICE WITH CONVERGED FUNCTIONALITY

CROSS-REFERENCE TO RELATED APPLICATIONS

This application is a continuation of 08/828,992 Mar. 31, 1997 ABN.

This application hereby incorporates by reference the following co-assigned patent applications which describe related subject matter in greater detail:

| application Ser. No. | TITLE | INVENTOR(S) | FILED |
|---|---|---|---|
| 08/803,185 | Computer System Design For Distance Viewing Of Information And Media And Extensions To Display Data Channel For Control Panel Interface | Montgomery McGraw; Ralph Williamson; Elizabeth Richard, Drew S. Johnson; Christopher D. Voltz; John Barker; Kevin J. Brusky | 2/19/97 |
| 08/726,648 | Integrated Contact Guide For Interactive Selection Of Content And Services On Personal Computer Systems With Multiple Sources And Multiple Media Presentation | John Stautner; Richard Lawson; Brian Belmont | 10/07/96 |
| 08/785,851 | Access Control For A TV/PC Convergence Device | Brian Belmont; Kevin J. Brusky | 1/21/97 |
| 08/829,152 | Computer System With Special Circuit Board Arrangements | Mark Aubuchon; John Barker | 3/31/97 |
| 08/744,096 | Method And Apparatus For Presenting Video On A Display Monitor Associated With A Computer | Drew S. Johnson | 11/5/96 |
| 08/829,367 | Method For Improving IR Transmission From A PC Keyboard | Ralph Williamson; Curtis Crisler | 3/31/97 |
| 08/783,608 | PC/TX Usage Tracking And Reporting Device | Brian Belmont | 1/14/97 |
| 08/804,750 | Improved Universal Remote Control | Kevin J. Brusky; John W. Frederick | 2/21/97 |
| 08/747,263 | Platform For Displaying Information From Multiple Sources | Robert Lund | 11/12/96 |
| 08/829,437 | Power Management Schemes For Apparatus With Converged Functionalities | Kevin J. Brusky | 3/28/97 |
| 08/829,150 | Method And System For Managing Content From Multiple Sources | William H. Ellis | 3/31/97 |
| 08/829,733 | Computer Convergence Device Controller For Managing Various Display Characteristics | Mark P. Vaughan; Derrill L. Sturgeon; Drew S. Johnson | 3/31/97 |
| 08/828,522 | Hardware System For Genlocking | Christopher D. Voltz | 3/31/97 |
| 08/828,521 | Mechanism And Method For Focusing Remote Control Input In A PC/TV Convergence System | Kevin J. Brusky; Christopher A. Howard | 3/31/97 |
| 08/829,197 | System And Method For Genlock Control | Drew S. Johnson | 3/31/97 |
| 08/831,480 | Methods And Apparatus For Converting Remote Control Signals Into Computer Keyboard Signals | Kevin J. Brusky; John W. Frederick | 3/31/97 |
| 08/829,202 | Improved Digital Bus | Christopher D. Voltz | 3/31/97 |
| 08/829,240 | Method And Apparatus For Overriding Access Security To A PC When A Password Is Lost | Mark P. Vaughan; Derrill L. Sturgeon | 3/31/97 |
| 08/829,204 | Automatic Cursor Parking To Hide A Mouse Pointed | Mark P. Vaughan; Kevin J. Brusky | 3/31/97 |
| 08/828,524 | Converging Autorun Scheme | Kevin J. Brusky; Derrill L. Sturgeon | 3/31/97 |
| 08/834,543 | Managing Complexity of Disparate Video Sources In A Home Theater Environment | Mark P. Vaughan; Thomas J. Brase; Drew S. Johnson; William H. Ellis | 3/31/97 |
| 08/828,594 | A Multi-Modal Display System | John W. Frederick | 3/31/97 |
| 08/829,196 | User Interface, And Associated Method, For A Convergence Device | Kevin J. Brusky; Derrill L. Sturgeon; Jeffrey T. Lininger; Richard J. Lawson | 3/31/97 |

BACKGROUND OF THE INVENTION

1. Technical Field of the Invention

The present invention relates to devices with integrated multiple functional modalities, and in particular, to convergence device systems having integrated computer and consumer/home electronics functionalities.

2. Description of Related Art

Achieving convergence of various information, entertainment and communications technologies has become a much sought-after goal. A highly visible example of this trend is the attempt to integrate computer technologies (such as, for example, personal computer technologies) with consumer/home electronics technologies (such as, for example, television technologies, video game technologies, video telephony, video/laser disc technologies, et cetera). It is hoped that one of the products of this convergence would be a single integrated device for information, entertainment and communications, which device can, at least in part, utilize the available communications bandwidth, mass storage and graphics handling capabilities of the personal computer (PC) to deliver, store and display a variety of applications so as to provide a seamlessly unified audio-visual environment to consumers.

In spite of many recent advances in this area, several problems persist. One of the more significant difficulties relates to providing a user/viewer effective content control and engaging interactivity, preferably all in one machine, with selectable modes of "functionalities" that essentially appertain to experiences associated with different discrete entities, for example, a PC or a TV or a video/laser disc unit et cetera, such that the viewer can seamlessly make a transition from one functionality to another. Further, it can be appreciated that by providing a functionality that is as close as possible to a discrete unit in terms of the viewer's experience thereof, the convergence aspect of the machine is greatly enhanced. Such enhanced convergence may be necessary or desirable in relation to increasing the "appeal" and feature-set of the integrated device.

Current developments in this area fall into two broad categories. One category relates to conventional TV sets with access to the Internet or the World-wide Web. The other category relates to PCS with a limited TV functionality. Neither of these categories provide a "fully-converged" system wherein the viewer can seamlessly select from a broad "menu" of experiences, each of which comprises a functionality that is substantially identical to one offered by an individual discrete unit. Current TV sets with Web access do not offer the full range of PC functionality. On the other hand, current PCS operable with TV signals provide only a limited TV experience in that a TV application is typically displayed as a window on the PC desktop presented on the same monitor associated with the PC. Typically, the viewer does not experience in these systems a TV viewing environment that is identical to a conventional TV with over-scanned display images having enhanced brightness, sharpness, contrast and color temperatures, enhanced Red-Green-Blue (RGB) amplifier gains et cetera.

Accordingly, based upon the foregoing, it should be understood and appreciated that there is a need for a system that is more completely converged than is currently known or possible in order to provide a user/viewer with a seamless environment for education, entertainment, communications and information. Although systems such as TVS with Web access and PCS with TV in a window described above have been extant for sometime, no current system is known to have all of the advantages and novel features of the system described and claimed hereinbelow.

SUMMARY OF THE INVENTION

In one aspect, the present invention is drawn to an electronic convergence device comprising a computer for generating indications of a first mode of operation and for generating indications of a second mode of operation; and an output device coupled to the computer to receive the indications of the first mode of operation and to receive the indications of the second mode of operation, wherein the output device is provided for at least alternately outputting the indications of the first mode of operation and the indications of the second mode of operation.

In another aspect, the present invention relates to a system operable to provide computer functions and operable to provide convergence functions, which system comprises a convergence functionality device for generating convergence function signals; a computer coupled to the convergence functionality device to receive the convergence function signals, the computer for generating computer function signals; and a display device coupled to the computer to receive the computer function signals and the convergence function signals, the display device being operable to at least alternately display the computer function signals in a manner which appear to a user to be the computer functions and to display the convergence functions signals in a manner which appear to the user to be the convergence functions.

In a yet another aspect, the present invention is drawn to a method of operation for an electronic convergence device, which method comprises the steps of: generating indications of a first mode of operation; generating indications of a second mode of operation; and outputting, in at least a user selectable alternate manner, the indications of the first mode of operation and the indications of the second mode of operation.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
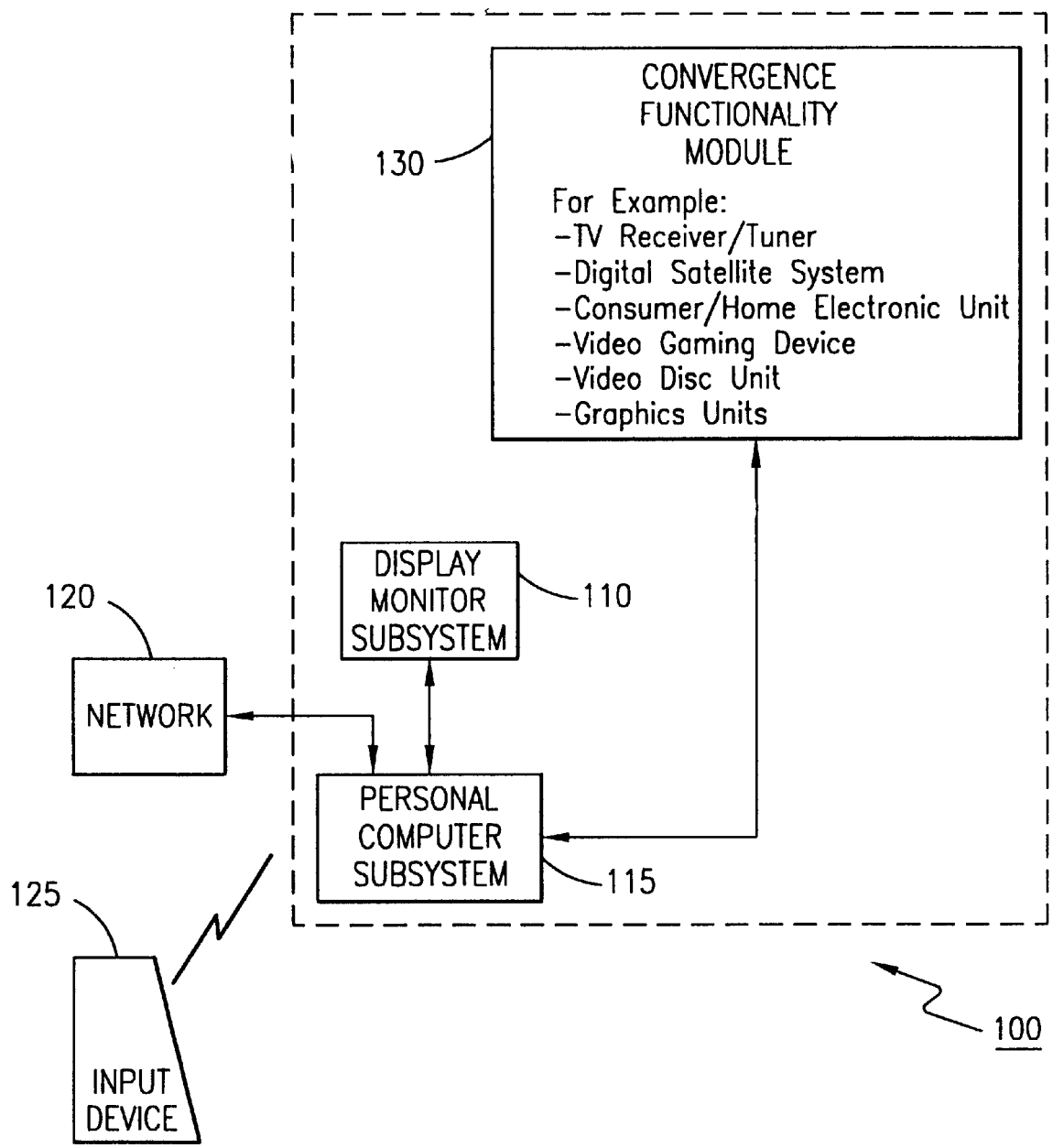
FIG. 1 illustrates an exemplary convergence device system provided in accordance with the teachings of the present invention.

Referring now to the Drawings wherein like or similar elements are designated with identical reference numerals throughout the several views, and wherein the various elements depicted are not necessarily drawn to scale, and, in particular, to FIG. 1, there is shown a block diagram of an exemplary convergence device system (or, an electronic convergence device) 100 provided in accordance with the teachings of the present invention. This block diagram is not necessarily intended to schematically represent specific modules of hardware or any particular data or control paths therebetween.

The convergence device system 100 includes a first subsystem, display monitor subsystem 110, operable to receive and display thereon display signals (or, indications thereof) received from a second subsystem, computer subsystem 115. Although not depicted, the subsystem 115 comprises a processor unit coupled to a storage unit, and may further preferably contain a communication port for enabling communication between the convergence device system 100 and a network 120.

Continuing to refer to FIG. 1, the network 120 can be understood to be any network, for example, a Local Area Network, a Metropolitan Area Network, a Wide Area Network, or the Internet. The computer subsystem 115 is connected to a convergence functionality module 130 that is adapted to receive and/or provide various combinations of composite and/or RF and/or video and/or audio and/or graphics and/or data signals. For example, the module 130 may comprise a receiver for receiving TV signals in any form, such as the National Television Standards Committee (NTSC) form or the Phase Alternate Line (PAL) form, via any medium, digital or analog, such as the cable system, the Digital Satellite System, or a network broadcast medium. In another embodiment, the module 130 may comprise a consumer/home electronics unit adapted to be integrated with the computer subsystem 115. For example, a video gaming unit or a video disc unit may be provided such that the outputs (video, audio, or both) of the units are controlled or modulated by the computer subsystem 115. A video controller service in the subsystem 115 may be responsible for managing these outputs such that appropriately modulated (or decoded or processed) display signals (or, indications thereof) are selected to be forwarded to drive suitable output devices, for example, the display monitor subsystem 110 or an audio output device (not shown).

Although the module 130 and the subsystem 115 are shown to be two separate yet interconnected entities, the module 130 may in some embodiments of the present invention be integrated into the subsystem 115. Such an integrated subsystem may comprise in a single housing one or more video sources (or consumer/home electronics units including receivers for TV signals, gaming units, VCRs, video/laser disc units, video telephony units etc.), the video control service for managing and selecting among these sources and for generating appropriate display signals (or, indications thereof) to be provided to suitable output devices, and the processor and storage units. Still continuing to refer to FIG. 1, the convergence device system 100 may be operable with an input device 125 which may comprise any of the following: remote control units, remote trackball/mouse devices, remote pointing devices, wireless or wired keyboards, keyboards integrated with pointing devices, track-balls and the like. Further, although not shown in this FIG., it should also be understood that the convergence device system 100 may contain such hardware modules as a power unit for supplying power thereto, TV tuner boards, CD-ROM players, floppy drives, printer ports, video ports et cetera.

Figure 2:
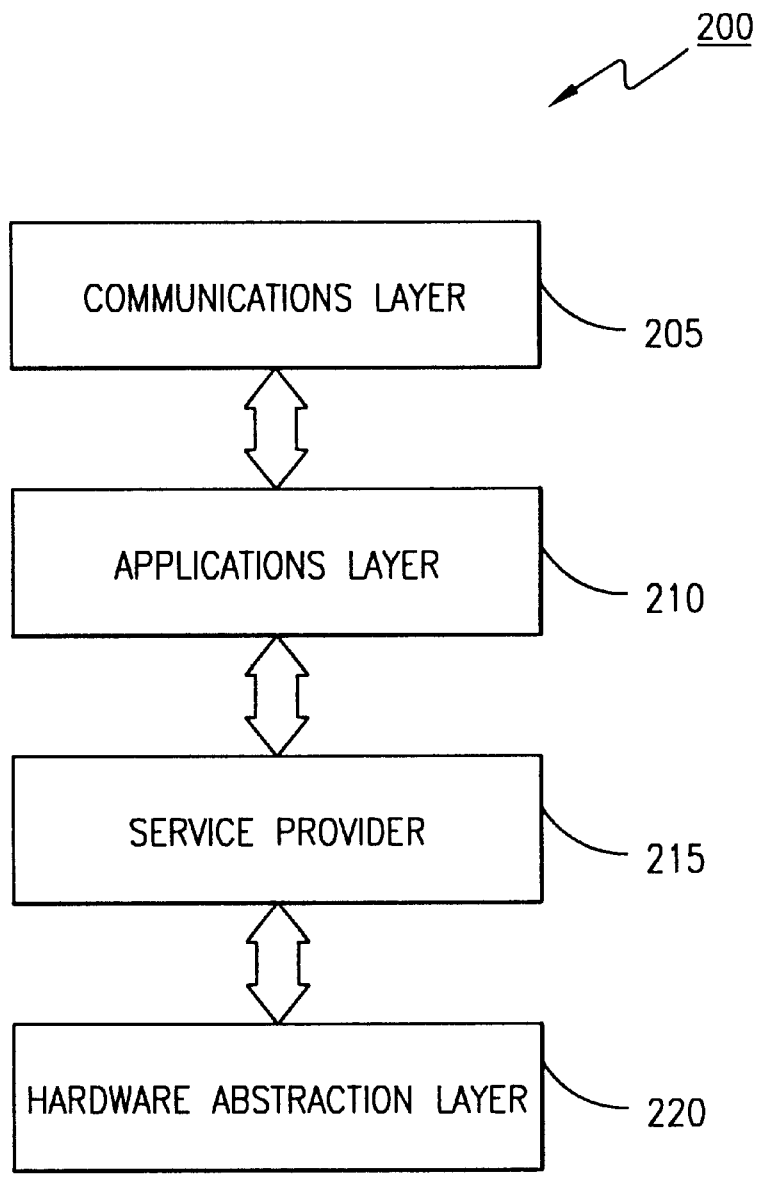
FIG. 2 depicts a block diagram of a high-level architectural scheme for use with an exemplary convergence device system provided in accordance with the teachings of the present invention.

Referring now to FIG. 2, there is shown a block diagram of a high-level architectural scheme 200 for use with the exemplary convergence device system 100. At the lowest level is one or more hardware abstraction layers (HALs) 220 which preferably handle direct hardware interfaces coupled to various hardware entities such as remote devices, keyboards, TV decoders, video decoders, display controllers, audio mixers, compact disc drives et cetera. Preferably, the hardware abstraction layer 220 can completely hide the specifics of implementation of different hardware modules as long as they perform the same function. Immediately above the HAL 220 is a service provider layer 215 which interfaces to the HAL 220 by a defined mechanism. This defined mechanism, in some instances, may be a widely accepted suitable standard that is specific to the type of an application in use. The service provider layer 215 exports an application-specific Application Programming Interface (API) for an applications layer 210 to use. It is presently preferred that the API be a standard interface. It should be understood that as new functions are added, a new standard API may have to be developed for implementing such a new function in the convergence device system of the present invention.

Continuing to refer to FIG. 2, the application layer 210 handles, at least in part, one or more direct user interfaces for the user to control a feature-set that may be provided with the convergence device system 100. A communications layer 205 is provided in the scheme 200 for facilitating information and data exchange between the applications. It can be appreciated by those skilled in the art that the architectural scheme 200 is flexible and extensible so as to support a variety of software and hardware modules, additional services and functionalities necessary for achieving such a degree of convergence as contemplated within the ambit of the present invention.

An Operating System (OS), for example, Windows 95®, associated with the convergence device system 100 may preferably be provided with a plurality of selectable items on the base level of its start menu such as, for example, the following: Programs, Documents, Settings, Find, Help, Run, Mode_Select, Setup, Video Entertainment Center (VEC) or Video Center Service Applications and/or Bundled Applications. Access to these items may be facilitated via a START or MENU button that may be preferably located on a remote control unit operable with the system 100.

Figure 3:
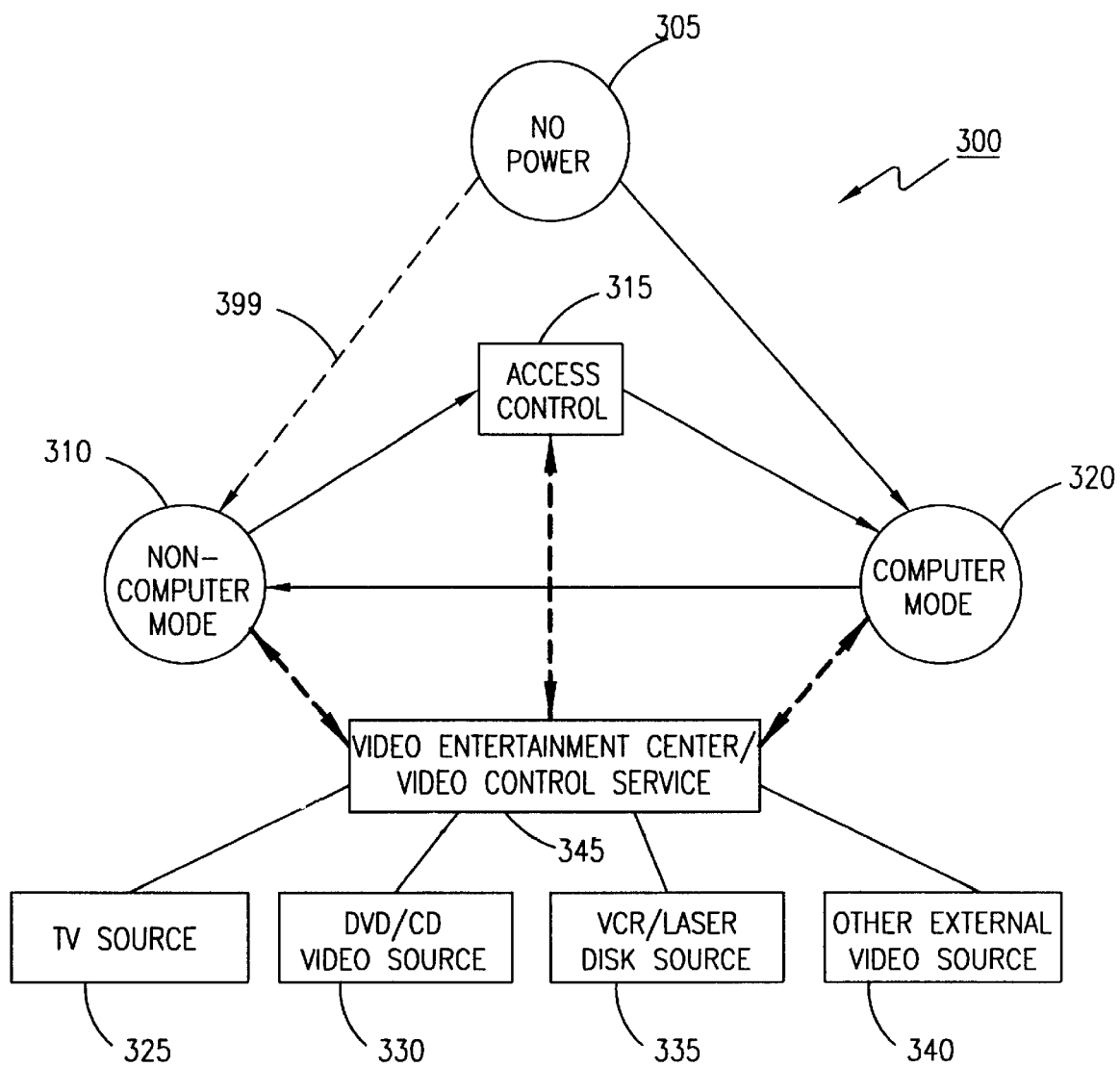
FIG. 3 depicts a state diagram for modal transitions in an exemplary convergence device system provided in accordance with the teachings of the present invention.

The Mode_Select item is provided, at least in part, for facilitating a selection by user for experiencing and/or operating and/or interacting with one of the converged functionalities (or, modalities) presently supported by the system 100. FIG. 3 depicts a state diagram for modal transitions in the exemplary convergence device system 100 provided in accordance with the teachings of the present invention. In a presently preferred exemplary embodiment, a first mode of functionality is referred to as a "computer" mode 320 wherein the system 100 is preferably experienced by the user as a Personal Computer with a complete "look and feel" thereof. In this mode, the display monitor associated with the system 100 preferably possesses the following characteristics: underscan of the display image, disabled velocity scan modulation, a pre-determined "low" value associated with contrast, brightness and color temperature settings et cetera.

In accordance with the teachings of the present invention, a second mode of functionality and/or viewer experience, referred to as a "non-computer" mode 310, is provided for the system 100. It is preferably provided in this mode that the user experience is substantially identical to that of a functionality and look/feel offered by a discrete unit such as, for example, a TV 325, a Digital Versatile Disc or Compact Disc source 330, a VCR/Laser source 335, or any other external video source 340 currently known or to be developed in the future.

Continuing to refer to FIG. 3, the Video Entertainment Center or Video Control Service 345 is shared by both modes 310 and 320 for operating and/or managing and/or accessing the various discrete units described above. When the system 100 makes a transition from a "no power" state 305, it enters initially state 320. Immediately thereafter, the system 100 progresses to the functionality associated with state 310, mediated by the VEC/VCCS 345. Functionally or experience-wise, therefore, the system 100 is seen to make a transparent transition to state 310 from the "no power" state 305, which transition is shown as a unidirectional "dotted line" 399 in this FIG. Further, as can be seen, transition from state 310 to state 320 may be preferably mediated via an access control mechanism 315 operable in conjunction with the VEC/VCCS 345. It should be understood that access control mechanisms may range from simple passwords to various advanced encryption techniques.

In a presently preferred exemplary embodiment, while in state 310 (that is, operating in the non-computer mode), the user may opt to experience any of the following functionalities including, but not limited to: watching TV in full-screen in overscan image, activating and controlling a separate Picture-In-Picture (PIP) window, viewing an external video source (for example, VCR, laser Disc, gameplayer, external Digital Satellite System, external DVD etc.), swapping a PIP image, watching a Motion Picture Experts Group (MPEG) standard video clip, using an Electronic Program Guide, accessing and interacting with Hyper_Text_Markup_Language (HTML) pages and/or accessing additional menued applications. Further, in this mode, the display monitor associated with the system 100 may preferably possess the following characteristics: overscan of the display image, enabled velocity scan modulation, a pre-determined "high" value associated with contrast, brightness and color temperature settings et cetera.

It is contemplated within the ambit of the present invention that a preferred exemplary modality relating to state 310 may be a "TV mode" wherein the user obtains an experience that is most nearly identical to that of a conventional TV. In addition to the features described above, the system 100 may preferably be provided with additional features to enhance this modal experience, such as, for example, enabling/disabling closed captioning, channel up/down, direct channel selection, control of display features —brightness, contrast and the like, control of audio, frame freezing, saving frozen frames to files et cetera.

Although not shown in FIG. 3, it should be understood that while in state 320 (that is, computer mode), it is possible for the user to experience a TV program in a PC window ("TV in a window") which preferably appears as a selectable item on a task bar associated with the PC desktop. This "TV in a window" is not the same as the "TV mode" as described hereinabove in relation to state 310. If the user selects the TV application from the task bar, the application will come up in a window which may be dynamically sized and placed on the desktop, just like a normal PC window. However, in a presently preferred exemplary embodiment of the present invention, a PIP would not be permitted in this experience, and display settings and characteristics associated with the non-computer mode would not be available. On the other hand, while engaged in "TV in a window" functionality, the user can switch to the "TV mode" by operating a button on the remote control unit, or by selecting the TV source item on the MENU bar.

Based on the foregoing description, it should be appreciated by those skilled in the art that the convergence device system provided in accordance with the teachings of the present invention overcomes the shortcomings and deficiencies of current technologies by fully converging the functionalities of various discrete units into an integrated device for multiple experiences, each being selectable by the user. It should further be understood that whereas individual consumer/home electronics units are "hardware-optimized" for delivering a particular user experience, the present invention teaches a more versatile system that is selectably optimized for a "menu" of experiences presented to the user.

Figure 4:
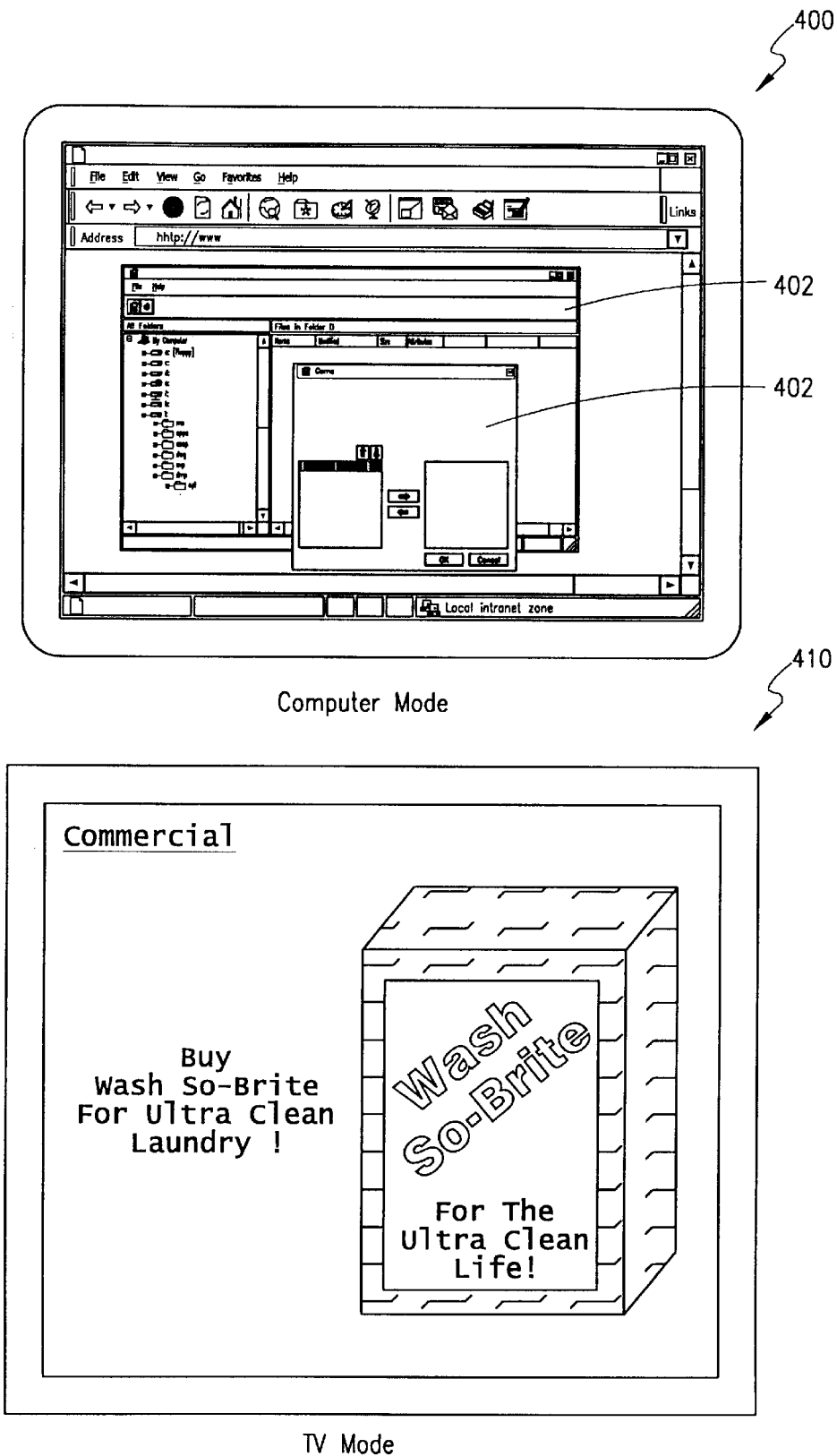
FIG. 4 depicts examples of a monitor subsystem displaying computer mode and TV mode.

FIG. 4 depicts exemplary examples of computer mode 400 and TV mode 410 in accordance with the above discussed exemplary embodiments of the present invention. In computer mode a plurality of windows may be displayed such that the windows overlap each other as found in standard personal computer operating systems such as Windows 95. Each window has a border about it. In TV mode 410 the display monitor subsystem 110 will have the look and feel of a television screen. There will not be a border around the TV screen in TV mode, but instead the screen will be in an overscan mode such that the picture consumes the entirety of the screen and may be overscanned beyond the screen's boarders. Conversely, computer mode the screen is underscanned with a boarder about each window.

Although only certain embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An electronic convergence device comprising:

an apparatus operable in a personal computer mode of operation and in a TV mode of operation;

a display device coupled to said apparatus operable to receive and display output of said personal computer mode of operation and to receive and display output of said TV mode of operation, said output device for at least alternatively outputting said output of said personal computer mode of operation and said output of said TV mode of operation wherein output of said TV mode of operation can be displayed in a format resembling that of a conventional TV receiver full screen display;

said convergence device selectively operable and controllable by at least one user input device in said personal computer mode of operation and in said TV mode of operation; and said convergence device further operable under control of operating system software for execution of user selectable computer programs and to provide a graphical user interface for selection of functions in said PC mode of operation.

2. The electronic convergence device as recited in claim 1, wherein said TV mode also includes a video viewing functionality.

3. The electronic convergence device as recited in claim 1, wherein said TV mode of operation includes television signal receiver and viewing functionality.

4. The electronic convergence device as recited in claim 1, wherein said personal computer mode includes a video source viewing functionality.

5. A system operable to provide personal computer mode functions and operable to provide TV mode functions, said system comprising:

a convergence functionality device for generating TV mode function signals;

a personal computer coupled to said convergence functionality device to receive and manage said TV mode function signals, said personal computer operable under control of an operating system for execution of user selectable computer programs and for generating personal computer mode function signals; and a display device coupled to said personal computer to receive said personal computer mode function signals and said TV mode function signals, said display device operable to at least alternatively display said computer mode function signals and said TV mode function signals, said display device operable in an overscan mode to generate a full screen display of said TV mode function signals resembling a conventional TV receiver display;

said operating system software operable to produce a graphical user menu-select display by said display device of user options for selecting said personal computer mode function;

and said convergence functionality device being selectively operable under control of a user input device.

6. The system as recited in claim 5, wherein said convergence functionality device includes a video apparatus for generating video signals.

7. The system as recited in claim 5, including a television tuner operable to provide at least some of said TV mode function signals.

8. The system as recited in claim 5, wherein the TV mode of operations enables a TV mode picture-in-picture display within said full screen display of TV mode function signals.

9. The system as recited in claim 5, wherein the PC mode of operation enables display of TV source signals in a PC window by said display device, and further including a user input device operable to switch from said display in a PC window to said TV mode of operation display of said TV source signals.

* * * * *